May 15, 1934. W. HEMINGWAY, JR., ET AL 1,958,853
CIRCUIT CLOSER FOR THE SIGNALING SYSTEMS FOR AUTOMOBILES
Filed March 14, 1931
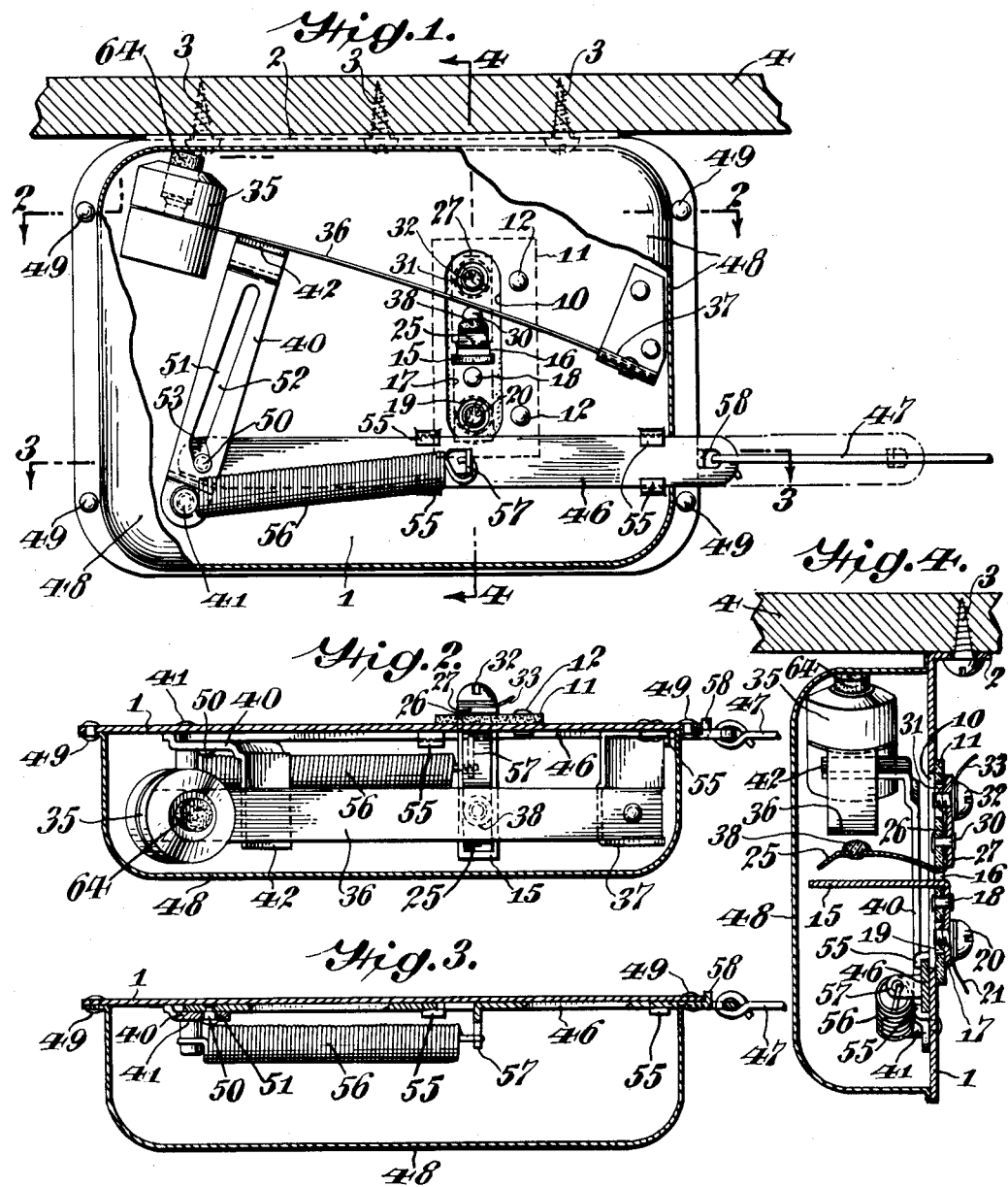

Patented May 15, 1934

1,958,853

UNITED STATES PATENT OFFICE 1,958,853

CIRCUIT CLOSER FOR THE SIGNALING SYSTEMS FOR AUTOMOBILES

Wilson Hemingway, Jr., and James B. Lockwood, Philadelphia, Pa.

Application March 14, 1931, Serial No. 522,696

2 Claims. (Cl. 200—52)

Our invention relates to circuit closers for the signaling systems for automobiles and other like vehicles, more especially to means for controlling electric lights upon such automobiles or other like vehicles, such, for example, as the stop light or lights thereof.

The general object of the invention is to provide a light signaling system for automobiles or other like vehicles with means of novel character for controlling the opening and closing of a circuit or circuits having lights therein for the purpose of causing the latter to flash, the said means being under the control and caused to function as a result of the operation of the progress-retarding means of an automobile or other like vehicle. The progress-retarding means as embodied in our invention and as illustrated herein consists of a pivoted lever constituting a brake-applying means but it will be understood that the progress-retarding device may consist of any other suitable movable means which may be employed for causing a retardation or slowing down in the movement of an automobile or other like vehicle.

It also is an object of the invention to provide a switch mechanism of novel character which is rendered operative upon the application of the brakes of an automobile or other vehicle to cause the stop or other lights thereof to flash; that is, an electric circuit is automatically interrupted at intervals so as to cause a corresponding interruption of the current available to flow therethrough so that the lights produced by such current are alternately lighted and extinguished automatically.

A further object of the invention is to provide an electric circuit of the lighting system of an automobile or other vehicle with a switch structure which includes means adapted to be released upon the operation of the automobile or other vehicle progress-retarding device consisting of a brake-applying lever as illustrated in the drawing, which means when so released operates automatically to open and close the switch with greater or less rapidity to open and close the said circuit which may include one or more electric lights one of which may be a stop light. The opening and closing of the said switch causes alternate lighting and extinguishing of the light or lights in the said circuit.

A still further object of the invention is to provide means for controlling the flow of electric current through a circuit of the lighting system of an automobile or other similar vehicle including a pendulum associated with a device for holding the said pendulum against vibration, and means having connection with the said device which means is actuated upon the application of the brakes of an automobile or other vehicle to cause movement of the said device, and permit movement automatically of the pendulum to thereby effect opening and closing movements of the said circuit.

Without attempting to set forth other and further objects of the invention we shall now proceed with a detailed description thereof wherein other objects either will be set forth or else will be apparent.

In order that our invention may be readily understood and its practical advantages fully appreciated reference should be had to the accompanying drawing wherein we have illustrated an embodiment thereof in a form which at present is preferred by us, but it will be understood that the invention may be embodied in other forms of construction and that changes in details of the construction may be made within the scope of the claims without departing from the said invention or the principle thereof.

In the drawing:

Fig. 1 is a view showing in section a portion of the bottom of the body of an automobile or other like vehicle, which may be regarded as representing the automobile or other vehicle, and also in elevation a switch constructed in accordance with our invention for closing and opening a circuit such as is shown in Fig. 5, the cover for the said switch being shown partly broken away and partly in section;

Fig. 2 is a horizontal transverse section taken on the line 2—2 of Fig. 1;

Fig. 3 is a similar view taken on the line 3—3 of Fig. 1;

Fig. 4 is a transverse sectional view taken on the line 4—4 of Fig. 1; and

Fig. 5 is a view showing diagrammatically a circuit of the light signaling system of an automobile or other vehicle, means for controlling said circuit, which means includes a switch mechanism, progress-controlling means for the automobile or other vehicle and a connection between said progress-controlling means and a part of the switch mechanism. Only one light is shown in Fig. 5 but obviously if desired a plurality of lights may be shown all of which may be controlled by a single circuit-controlling means.

In the drawing we have shown at 1 the base plate of a switch device for opening and closing the circuit of a light signaling system for automobiles or other vehicles. The said plate 1 is provided at one edge, being the upper edge when the device is in use, with a flange 2 having openings therein for the reception of screws 3 by means of which the switch device is secured to the under side of the bottom of an automobile body, a portion of which is shown at 4. The portion 4 of the automobile body may be taken as representing the automobile provided with brake mechanism.

An automobile electric light signaling system which embodies our invention includes an electric circuit having therein a switch structure for controlling the circuit; that is, for opening and closing the same. The switch structure should be located and supported at a point intermediate the brakes (not shown) and the brake-applying lever or other means. The connections between the brake applying lever or other equivalent means and the brakes are omitted but it will be understood that any suitable known connections may be employed. Preferably the switch structure included in the system which embodies our invention should be and usually, if not always, will be located upon the under side of the bottom of the automobile or other vehicle body. Our invention is not to be limited in any way by reference to the particular part of the automobile or other vehicle to which the switch structure may be attached or fastened nor to the particular means by which the switch structure may be controlled.

The switch contacts and the means for controlling the same are located upon one side of the plate 1. The plate 1 is provided with a vertically extending slot 10 which may be located with respect to the edges of the said plate as shown in the drawing. The slot is closed by means of a sheet 11 of suitable insulating material such, for example, as rubber, phenolic condensation product or the like, which is secured to the plate 1 by means of rivets 12 or other suitable fastening means. One of the contacts of the switch comprises a relatively thick metal plate one portion, 15, of which extends inwardly through an opening 16 and projects away from the plate 1. The outer portion 17 of the contact plate extends in parallel relation to the plate 1 and is secured to the sheet 11 and to the latter by a fastening 18. The outer end portion of the part 17 which extends over an opening 19 through the sheet 11 is provided with a screw-threaded opening for the reception of a binding screw 20 by means of which one end of a conductor 21 of the circuit is connected to the said portion 17. The other contact plate which co-operates with the first named contact plate is thin, yields readily to pressure, and is resilient and comprises a portion 25 which extends in general parallel overlying relation to the portion 15. The inner free movable end portion of the part 25 is bent toward the portion 15. The opposite outer end portion 26 of the resilient contact plate is extended through the opening 16 and is bent outwardly against and is in contact with the outer side of the sheet 11 of insulating material. A small metallic plate 27 overlies and rests against the portion 26 and is secured to the latter portion and to the sheet 11 by a fastener 30. The outer end portion of the small plate 27 overlies an opening 31 through the sheet 11 which portion is provided with a screw-threaded opening for the reception of a binding screw 32 by which one end of an electric conductor 33 of the circuit is connected with the small plate 27. For the purpose of causing vibratory movements of the resilient, readily movable contact plate 25, we have provided a pendulum comprising a relatively heavy head 35 connected to and supported upon the outer swinging end of a readily flexible, resilient member 36 preferably consisting of a thin sheet of suitable metal as shown. The member 36 at its end opposite that to which the head 35 is connected is fixedly secured to a support 37 having rigid and fixed connection with the plate 1. The member 36 of the pendulum is inclined upwardly from its point of connection to its support at 37 crosswise of and above the readily yielding and resilient switch member 25. When the pendulum vibrates it causes vibratory movements of the switch member 25. In order to prevent the pendulum from making contact with the contact member 25 we have provided the latter with a button-like member 38 of insulating material. If preferred, the button-like member 38 may be mounted upon the pendulum instead of upon the contact 25. The pendulum as it vibrates contacts with the member 38 and not directly with the switch 25 to cause vibratory movements of the latter. It will be understood that in its downward swinging movements the part 36 of the pendulum contacts with the part 38 to depress the yielding resilient switch member 25 so as to cause its outer end to contact with the adjoining portion of the relatively rigid portion 15 of the other switch member. The member 25 moves into closed position as a result of the pressure or force exerted thereon by the part 36 of the pendulum but its movement in an opposite direction into open position is due to its resilience.

As stated, the part 36 of the pendulum normally is held in spaced relation to and out of contact with the button-like projection 38 which is mounted upon the switch member 25. It is held in such position by the support 40 which is pivotally connected at its lower end upon the lower portion of the plate 1 by a pivot 41. The support 40 is in the form of a narrow metal strip having at its upper end a lateral projection 42 which extends in a direction away from the plate 1. Normally the projection 42 engages the underneath side of the part 36 of the pendulum and holds the said pendulum against vibration with the said part 36 in spaced relation to and out of contact with the button-like projection 38. For the purpose of causing pivotal movement of the member 40 which is adapted to hold the pendulum against vibration and in inoperative position, we have provided a connection between the same and the brake lever 45 which may be regarded and referred to as progress-retarding means for the automobile or other vehicle. The said connection comprises a metal strip or bar 46 and a rod or wire 47. The outer end of the latter is connected to the brake lever 45, while its inner end is connected to the end of the strip or bar 46 which projects beyond the casing or cover 48 which is connected to the plate 1 by fastening means 49. The opposite end of the metal strip or bar 46 is provided with a headed pin 50 which engages a slot 51 which extends lengthwise of the pivoted support 40. The slot 51 has upper and lower portions 52 and 53 which are angularly related to each other. The upper portion 52 extends throughout the greater part of the length of the support 40, while the bottom or inner portion 53 is relatively short and extends inwardly in a direction which when the support 40 is in its upright position forms an obtuse angle with the medial line of the strip or bar 46. It also forms an obtuse angle with the medial line of the support 40. From its lower end the portion 53 of the slot is inclined upwardly and in a direction away from that in which the support 40 moves to release the pendulum. In the arrangement shown the strip or bar 46 forms an acute angle with the support 40. The angular arrangement as described may be changed without departing from the invention but should remain such as to cause a quick release of the pendulum upon pivotal movement of the support 40. The headed pin 50 normally occupies a position at the lower end of the portion 53. The bar 46 is slidably held upon the plate 1 by means of bent lugs 55 which may be integral with the plate 1 as shown. The connection comprising the strip or bar 46 and the rod or wire 47 is held in retracted position to retain the support 40 in upright position by means of a coiled spring 56, one end of which is connected at 57 to the strip or bar 46 while the opposite end thereof is connected to the pivot 41. The outer end of the rod or wire 47 is connected to the progress-retarding means of the automobile or other vehicle which in the construction shown is represented by the brake lever 45 at a point above the pivotal axis of the latter. Upon depression of the brake-applying lever 45 to apply through proper connections the brakes, which connections and brake are not shown, the connection including the parts 46 and 47 is pulled outwardly or away from the switch device. In moving outwardly the headed pin acting upon the inner side of the lower portion 53 of the slot 51 causes pivotal movement of the said support toward the right to disengage the projection 42 thereof from the flexible, resilient part 36 of the pendulum. The complete pivotal movement of disengagement of the support 40 is effected by the movement of the pin 50 in the portion 53 of the slot 51. The elongated portion 52 of the slot provides the necessary or at least desirable lost motion to permit the connection comprising the parts 46 and 47 to move through variable distances depending upon the distance of the connection thereto to the brake applying lever 45 from the pivot of the latter and also the distances through which the said lever may be moved under different and varying conditions of operation. The engagement of the headed pin 50 with the extended portion 52 of the slot 51 retains the support 40 in depressed or lowered position. The said support is not permitted to return to its normal position shown in Fig. 1 until after the pin 50 reaches the portion 53 of the slot and moves to the bottom thereof which happens upon release of the brake layer 45. The return movement of the connection between the support 40 and the brake lever 45 and of the said support under the influence of the spring 56 is limited by a stop 58 on the strip or bar 46 which contacts with an edge of the plate 1. The lever 45, as is well known, returns to normal position after each actuation thereof in the applying of the brakes. A spring or other means may be provided for causing such return.

It will be apparent from an inspection of the drawing that the connection between the brake lever and the support 40 need move but through a very short distance in order to effect movement of the support 40 to release the pendulum 36. The quick release of the pendulum thus effected is very desirable in order that the said pendulum may be quickly released and dropped so that it will strike the flexible and resilient contact 25 or the button-like member 38 of insulating material thereon to effect movement thereof into contact with the relatively rigid contact member 15. The part 36 of the pendulum being flexible and resilient, the portion thereof beyond the contact 25 is bent or carried forward under the momentum of the relatively heavy head 35. The continued movement of the head after contact of the part 36 with the contact 25 places the said part 36 under stress and by reason of its resilience it operates to cause a reverse or upward movement of the head 35 resulting in momentum in the opposite direction which causes an upward movement of the part 36. This back and forth movement continues for a considerable time so that the contact 25 may be caused to move into and out of contact with the contact 15 a great number of times, so as to alternately close and open the circuit including the conductors 21 and 33. To prevent the head 35 of the pendulum from striking or contacting directly with the adjoining side of the cover 48 we have provided the said head with a buffer 64 of rubber or other material suitable for use as a sound-deadening means. The flexible and resilient contact 25 may be described generally as of arcuate shape with the concave side facing the contact 25. It follows that when the outer end of the said flexible and resilient contact engages the relatively rigid contact 15 it is slightly flattened or straightened by the force exerted thereon by the pendulum. As a result of such flattening or straightening a sliding movement of the outer end thereof against the contact 15 is effected. Such sliding movement prevents oxidation to thereby insure that good electrical contact always will be made.

The electric circuit includes a source of electric energy such as a battery 60 to one side of which one end of the conductor 33 is connected, the other side being grounded as indicated at 61. The conductor 21 is connected to the light indicated at 62, the latter being also grounded as indicated at 63. The closing and opening of the switch contacts 15 and 25 as above described will cause alternate lighting and extinguishment of the light at 62 (which may be regarded as a stop light) or a flashing thereof. Such flashing of a light upon an automobile is much more apt to be noticed by persons approaching the said automobile than if the light should be steady and continuously showing. A plurality of lights may be included either in parallel or in series in the circuit.

Having thus described our invention, what we claim and desire to secure by Letters Patent is:

1. In a device of the character described the combination with an electric circuit and a switch for closing and opening said circuit, of a pendulum which is adapted to cause closing and opening movements of the said switch, an upwardly extending lever for contacting at its upper end with the said pendulum to hold the same against vibration at one limit of its path of movement, the said lever having a slot extending lengthwise thereof the lower end of which is located near the lower end of said lever and extends forwardly and at an angle to the remaining upper portion thereof, a pivot in engagement with the lower end of said lever to pivotally support the same, a reciprocative member having at one end a laterally extending projection which when the said lever is in upright position is in engagement with the lower end of the forwardly inclined portion of the said slot, the said projection acting upon the edges of the inwardly inclined lower portion of the said slot to cause a rapid pivotal movement of the said lever upon the initial movement of the said reciprocative member, the said projection being adapted to slide in the remaining portion of the said slot without causing pivotal movement of the said lever.

2. In a device of the character described, the combination of an electric circuit, a switch in said circuit, the contact points of which are normally out of contact with each other, a vibratable member for causing successive opening and closing movements of the said switch, means one end of which normally engages the said vibratable member to prevent vibration thereof, a pivot for pivotally supporting the said means at its opposite end, the said means being provided with an angular slot which extends lengthwise thereof, means engaging the said slot, and means for causing movement of the last named means to cause pivotal movement of the said first named means to disengage the same from the said vibratable member to permit vibration of the latter to cause closing and opening movements of the said switch.

WILSON HEMINGWAY, Jr.
JAMES B. LOCKWOOD.